United States Patent [19]

Orth et al.

[11] Patent Number: 5,219,200
[45] Date of Patent: Jun. 15, 1993

[54] FOLDING TOP FOR VEHICLE

[75] Inventors: Stefan Orth, Sindelfingen; Helmut Rottler, Aidlingen; Oliver Pudschies, Simmozheim, all of Fed. Rep. of Germany

[73] Assignee: Mercedes-Benz A.G., Fed. Rep. of Germany

[21] Appl. No.: 943,486

[22] Filed: Sep. 11, 1992

[30] Foreign Application Priority Data

Sep. 11, 1991 [DE] Fed. Rep. of Germany ....... 4130180

[51] Int. Cl.⁵ ............................................... B60J 7/12
[52] U.S. Cl. ..................................... 296/107; 296/116
[58] Field of Search ................ 296/107, 108, 116, 117

[56] References Cited

U.S. PATENT DOCUMENTS

| 4,693,509 | 9/1987 | Moy et al. ............... 296/107 X |
| 4,747,635 | 5/1988 | Wagner ................... 296/107 |
| 4,778,215 | 10/1988 | Ramaciotti .............. 296/107 |
| 5,002,330 | 3/1991 | Koppenstein et al. ....... 296/107 |

FOREIGN PATENT DOCUMENTS

| 3818616 | 6/1989 | Fed. Rep. of Germany . |
| 635389 | 4/1950 | United Kingdom . |
| 882575 | 11/1961 | United Kingdom . |
| 2141389 | 12/1984 | United Kingdom . |

OTHER PUBLICATIONS

French Search Report of French Patent Application No. 92 10 752, Dec. 11, 1982.
Great Britain Search Report of British Patent Application No. GB 9218961.2, Nov. 30, 1992.

*Primary Examiner*—Robert R. Song
*Attorney, Agent, or Firm*—Evenson, McKeown, Edwards & Lenahan

[57] ABSTRACT

The invention relates to a folding vehicle top whose top cover, which can be stretched over a supporting top frame, has laterally unsecured border regions which are connected to an associated leg of a corner strut via tie means and are only pulled into a fixed tensioned position, via a relative swinging movement of the corner strut, during the closure of the top. In order to be able to fix top cover corners present in the corner region between the top support pillars and the material retaining hoop on the top support pillar by means of the tensioning advance of the tie means, a rearwardly offset intermediate deflection of the tie means on the associated leg of the material retaining hoop is provided.

20 Claims, 3 Drawing Sheets

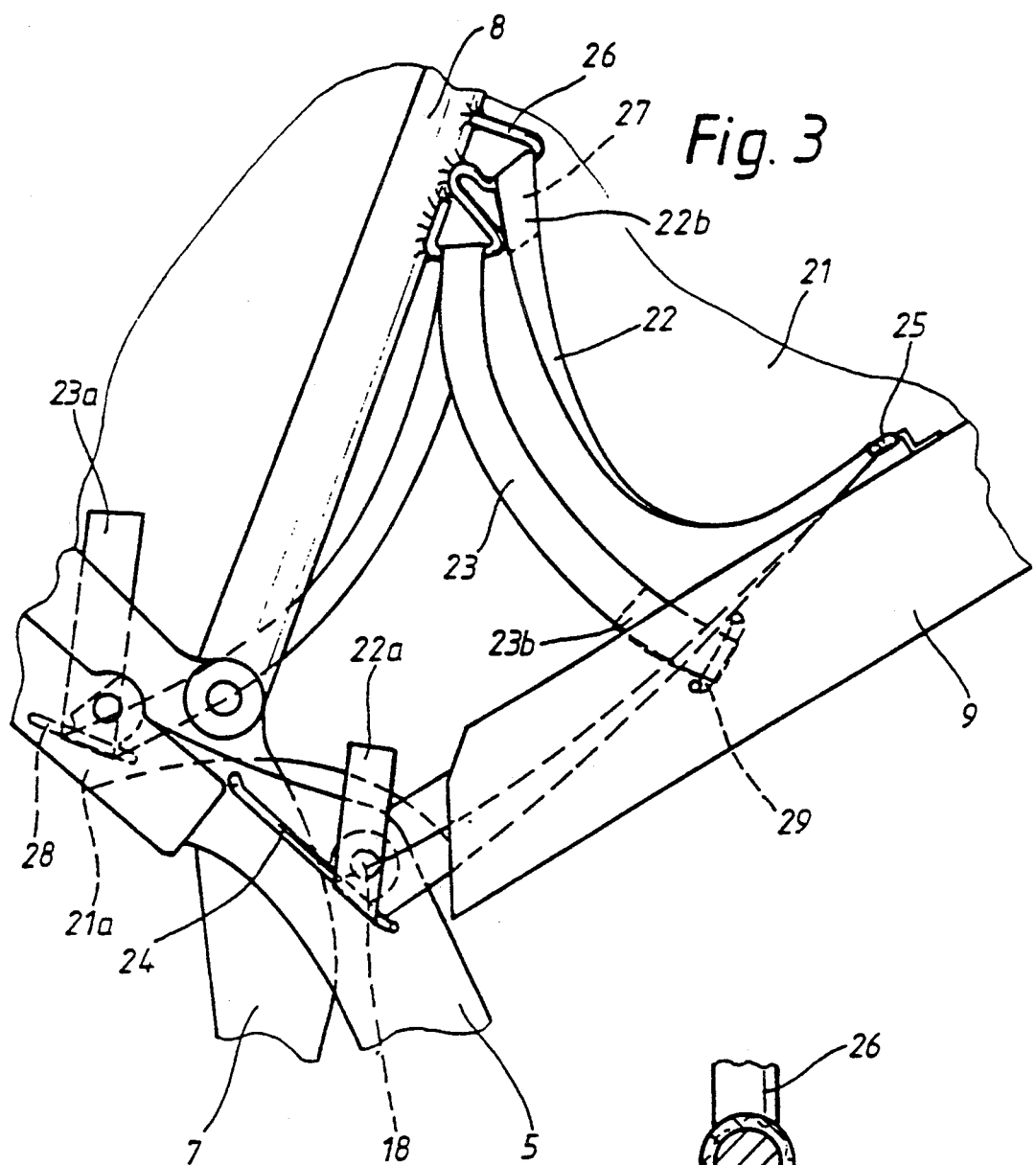
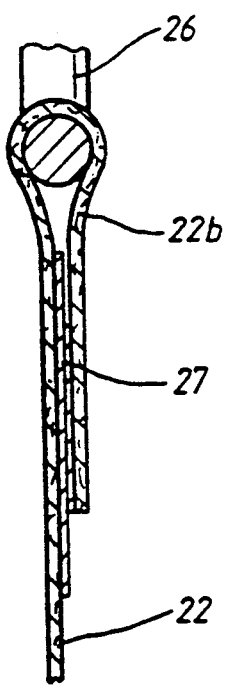

FOLDING TOP FOR VEHICLE

BACKGROUND AND SUMMARY OF THE INVENTION

The invention relates to a folding top for convertible vehicles of the type having a foldable frame supporting a flexible top cover which top can be selectively moved between an in-use closed position to a folded down stowed position.

German Patent 3,818,616 has already disclosed a folding top of this general type, the top cover being secured along the whole length of its terminating edges adjoining the rear of the side windows on retention rails which form part of the lateral top pillars of the main strut. To the side and behind the retention rails, the top cover is held by a U-shaped material retaining hoop which forms the lower termination of the folding top and is slidably articulated on its lateral legs on the associated top support pillar of the main strut.

In a top cover border region which includes the lower terminating edge and extends from the retention rail approximately as far as the longitudinal center of the associated leg of the material retaining hoop, no permanently operative fastening of the top cover to the profile of the material retaining hoop is provided. On the contrary, the border region is only pulled against the shaping periphery of the material retaining hoop, via a strap of rubber-elastic material, during the closure of the cover, the border region of the top cover thereby remaining tautly stretched with the top closed. For this purpose, one end of the strap is secured on the top cover, after which it enfolds a deflection hoop on the leg of the material retaining hoop. The other end of the strap is articulated on the lateral leg of a corner strut which can be raised automatically into its designed position during the closure of the top. Due to the change in the spacing of the articulation point for the strap relative to the leg of the material retaining hoop, the required tensioning advance of the strap can take place automatically.

Top concepts are also known in which the material retaining hoop is articulated directly on the associated top support pillar of the main strut by the forward ends of its lateral legs. Since there is no need here for any longitudinal displaceability of the material retaining hoop relative to the articulation point on the top support pillar, the top cover can be secured on the profile of the material retaining hoop all the way along its lower terminating edge, as far as the region of the joint. In front of the region of the joint, however, no permanent fastening of the top cover on the top support pillar is possible since the top cover stretched taut along the lower terminating edge would lead to blocking of the swinging of the material retaining hoop and opening of the top would not be readily possible.

In addition, fixing via straps which is operative only with the top closed, as known from German Patent 3,818,616, is not readily achievable with these border regions which include a lower length of the terminating edges extending along the top support pillars. This is all the more true if the corner strut is attached to the top frame near to the region of the joint which results in an insufficient change in the spacing of the lateral legs of the corner strut relative to the border regions during the erection of the folding top.

An object on which the invention is based is to modify a folding top of the generic type such that fixing of border regions which is operative only with the top closed is made possible via tie means which are situated in a lower region of the length of the terminating edges extending along the top support pillars.

This object is achieved according to preferred embodiments of the present invention by providing a folding top for convertibles comprising a top cover which can be stretched over a supporting top frame and is held along its lower terminating edge by a U-shaped material retaining profile and along its rear terminating edges, which adjoin the side windows, by lateral top support pillars of a main strut, the main strut being attached to the bodywork of the vehicle via its pivotably mounted top support pillars, having intermediate support for the top cover in a transverse plane between the material retaining hoop and the main strut by means of a U-shaped corner strut, the lateral legs of which corner strut are articulated on associated frame members, and having fixing of lateral border regions of the top cover on the associated frame member via first tie members, the first tie members connecting the terminating edges of border regions to the associated leg of the corner strut while being deflected at the frame member to pull the border region towards the frame member when the top is closed by virtue of the swinging of the corner strut relative to the material retaining profile, wherein the border regions to be fixed are held by the top support pillars of the main strut, the border regions including a lower length of the terminating edges of the top cover which extend along the top support pillars, and wherein the first tie members, starting from their deflection on the associated top support pillar, first of all extend rearwards towards a deflection point on the material retaining profile, which deflection point is offset rearwards relative to the pivot axis of the corner strut, and after enfolding the deflection point, they extend forwards towards their holding point on an associated leg of the corner strut.

In order to achieve favorable lever ratios for a corner strut articulated close to the border regions, the longitudinal center axes of the lateral legs of the corner strut and the directions of tension of the tie members extend relative to one another in a manner similar to the sides of an equilateral triangle, according to certain preferred embodiments of the invention.

The pivoting advance of the corner strut can simultaneously be used in an advantageous manner to fix corresponding border zones of an inner lining of the top cover via further tie members.

For reasons of durability, textile and thus flexible straps, which stretch only a little under tensile stress, are particularly suitable as the tie means.

To compensate for tolerances and to permit readjustment of the straps, these are preferably however of adjustable length.

Adjustment of the length of the strap is particularly simple if a loop at one end of the strap can be fixed in a variable manner via a velcro-type fastener according to especially preferred embodiments of the invention.

Essentially U-shaped hoops which are bent from rigid round wire and can thus be produced at a favorable cost are provided for the deflection of the strap.

Preferably only one holder, which serves for the connection of the strap associated with the top cover and for the deflection of the strap associated with the inner lining, is arranged on each of the two legs of the corner strut.

This holder too can be formed at a favorable cost from bending wire. The one-piece nature of the holder is also particularly expedient because it is thereby possible to guarantee precise spacing between the deflection point and the connection point. Due to the adjustability of the length of the straps, the holder can be connected to the corner strut without problems by welding or the like, providing weight and cost advantages.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic side view of the joint region according to FIG. 2 with the material retaining hoop raised; and FIG. 4 is a longitudinal sectional view through a strap articulation used with the convertible top construction.

DETAILED DESCRIPTION OF THE DRAWINGS

Figure 1:
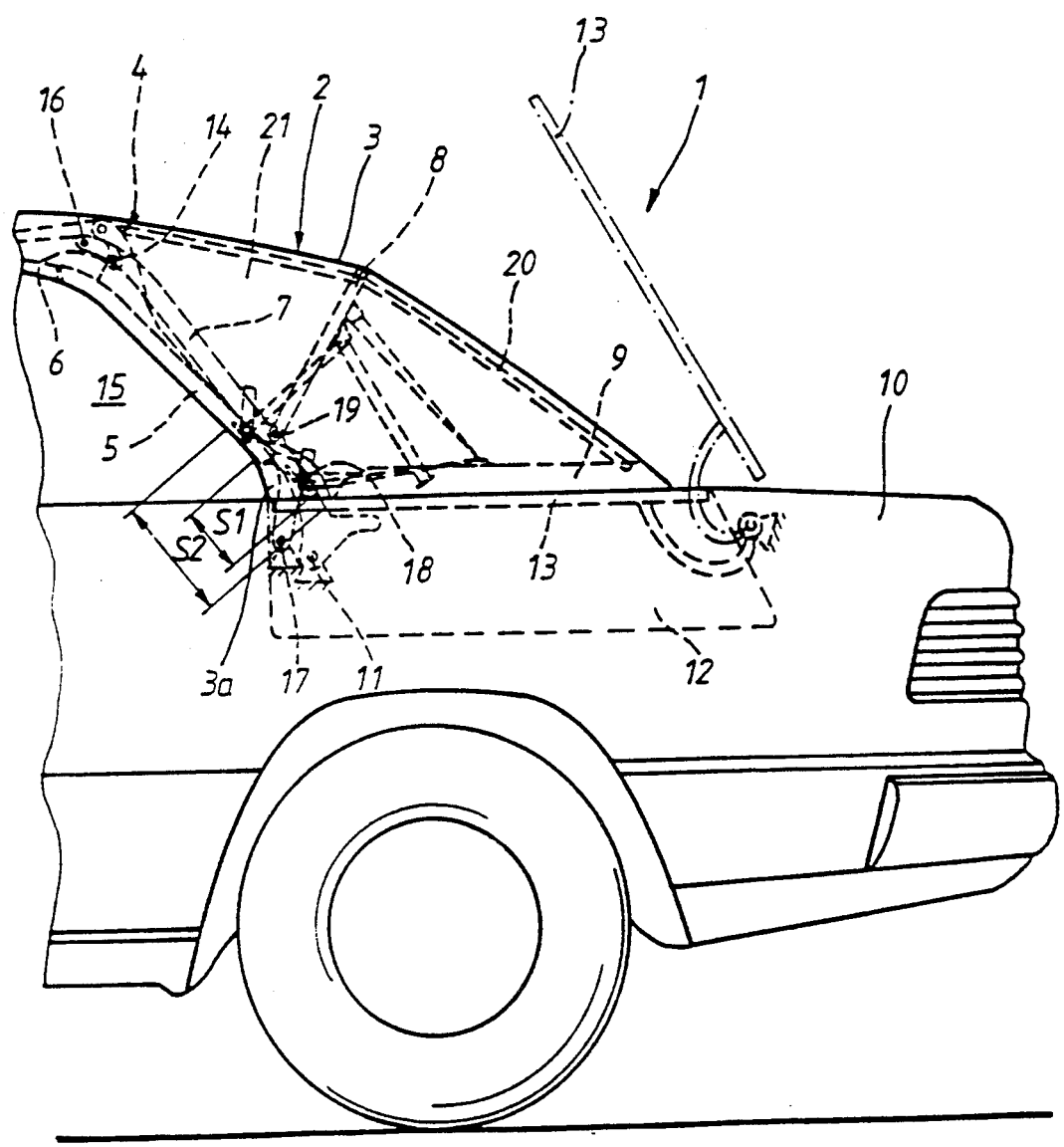
FIG. 1 is a schematic side view of a tail or rear region of a convertible automobile with the folding top closed, constructed according to a preferred embodiment of the invention.

Only the rear part of a convertible 1, that part which is essential to the invention, is shown in FIG. 1. The convertible is provided with a folding top 2, which comprises, in customary fashion, a top cover 3 which is stretched over a supporting top frame. In the side region, the supporting top frame comprises a main strut 4 with lateral top support pillars 5, lateral roof frames 6, lateral connecting rods 7, a U-shaped corner strut 8 and, at the lower termination of the folding top 2, a U-shaped material retaining hoop 9.

The top frame, which is mirror-symmetrical in relation to the longitudinal median plane of the convertible 1 is mounted to pivot about a horizontal vehicle transverse axis of the bodywork 10, the top support pillars 5 being articulated below the top edge of the vehicle side at main bearings 11, which are situated in the lateral legs of a U-shaped top stowage box 12 which surrounds the rear seating area of the convertible 1 and the upward-facing opening of which is covered by a matchingly shaped top box lid 13.

Starting from the top edge of the side of the bodywork 10, the visible top support pillar 5 extends obliquely upwards and forwards as far as the central tube (connecting the top support pillars 5 to one another) of the main strut 4, which rests against the underside of the top cover 3 and provides support. The rear end of the lateral roof frame 6, which extends forwards above the side window 15, is mounted in the upper end region of the top support pillar 5 via a hinge joint 14. The roof frame 6 is held in its design position via the associated main connecting rod 7, which extends essentially parallel and adjacent to the top support pillar 5, its upper end being connected at a certain distance in front of the hinge joint 14 to the roof frame 6 via a hinge joint 16 and its lower end being connected at the same distance in front of the main bearing 11 to the bodywork 10 via a hinge joint 17. The lateral roof frame 6 is thus guided by the top pillar 5 and the main connecting rod 7 in the manner of a parallelogram.

The material retaining hoop 9 rests in leak-tight fashion on the closed top box lid 13 and is locked to the latter in the rear region by a catch (not shown). With the front ends of its lateral legs, the material retaining hoop 9 is in each case connected via a hinge joint 18 to the associated top support pillar 5, which joint, with the top 2 closed, is a short distance above the top edge of the vehicle side.

The corner strut 8 is arranged at a distance above the material retaining hoop 9 and is articulated with the front ends of its lateral legs on the associated main connecting rod 7 via in each case one hinge joint 19. In this position, corner strut 8 spans a transverse plane (inclined virtually at right angles to the longitudinal extension of the top pillars 5) of the top 2 and, along the corner contour of the latter, rests supportively against the underside of the top cover 3. In the transition zone between its central tube and its lateral legs, the corner strut 8 is connected via positioning straps 20, which extend underneath the top cover 3 in the longitudinal direction of the vehicle, to the central tube of the main strut and the central region of the material retaining hoop 9. These positioning straps 20 extend along lateral sides of a rear window and have only a low longitudinal extensibility and are tautly stretched when the top 2 is closed. See commonly assigned co-pending application Ser. No. 07-949922, filed Sept. 8, 1992 based on German Application P 41 29 493.9 for further details of embodiments of a convertible top with such positioning straps.

To open the folding top 2, front top catches which connect the front roof part (not shown) to a bodywork frame extending above a windscreen, must first of all be released. The material retaining hoop 9 is then unlocked and swung up forwards about the axis defined by the hinge bearings 18, i.e. moved relative to the raised main strut 4. The top box lid 13 can now be unlocked and, as indicated by broken lines, folded into its rearwardly raised release position. By then swinging back the main strut 4, during which procedure the front roof part is folded onto the roof part behind it via parallelogram linkages and the rear roof part provided with the roof frame 6 is folded positively via the top support pillar 5 and the main connecting rods 7 onto the main strut 4, the folding top 2 is retracted completely into the top box 12, after which the top box lid 13 can be shut.

Along the periphery of the shaping profile of the material retaining hoop 9, the top cover 3 is secured on the underside of the profile, the lower terminating edge of the top cover 3 extending directly along the straight bottom edge of the material retaining hoop 9. Releasable connecting means of known type, such as screws or the like are used for fastening. This permanent fastening ends only in the forward end region of the lateral legs of the material retaining hoop 9, close behind the hinge joint 18. After this, the rear terminating edge of the top cover 3 continues forwards in a straight line as far as the front edge of the top support pillar 5, the overlying border region of the top cover 3 overlapping the top support pillar 5 at its outer surface without direct fastening and merging into the terminating edge which extends along the rear edge of the side window 15. Along this obliquely extending terminating edge, the top cover 3 is held by the top support pillar 5, permanent fastening of the top cover 3 via releasable fastening means being provided over the upper longitudinal region of said edge. In the lower end region of the terminating edge, the border region does overlap the top support pillar 5 but without direct fastening. This results, overall, in a "material slack" S1 of the top cover 3, by means of which a corner 3a extending diagonally is not secured directly on frame members and thus does not hinder swinging of the material retaining hoop 9.

To ensure that the top frame of the folding top 2 remains invisible from the interior of the convertible 1, it is covered by a decorative inner lining 21 made of flexible material, which is stretched between the frame members of the top frame in a manner corresponding to the top cover 3 situated opposite. Due to the kinematics of the cover frame, a somewhat larger material slack S2 is required here in the transitional region from its permanent fastening on the leg of the material retaining profile 9 to its permanent fastening on the associated top support pillar 5, the said slack extending approximately as far as the height at which the hinge joint 19 is arranged. In the region of overlap with the top support pillar 5, the inner lining 21 also has a corner-like border zone 21a, which is held and overlaps the inner surface of the top support pillar 5 without direct fastening.

Figure 2:
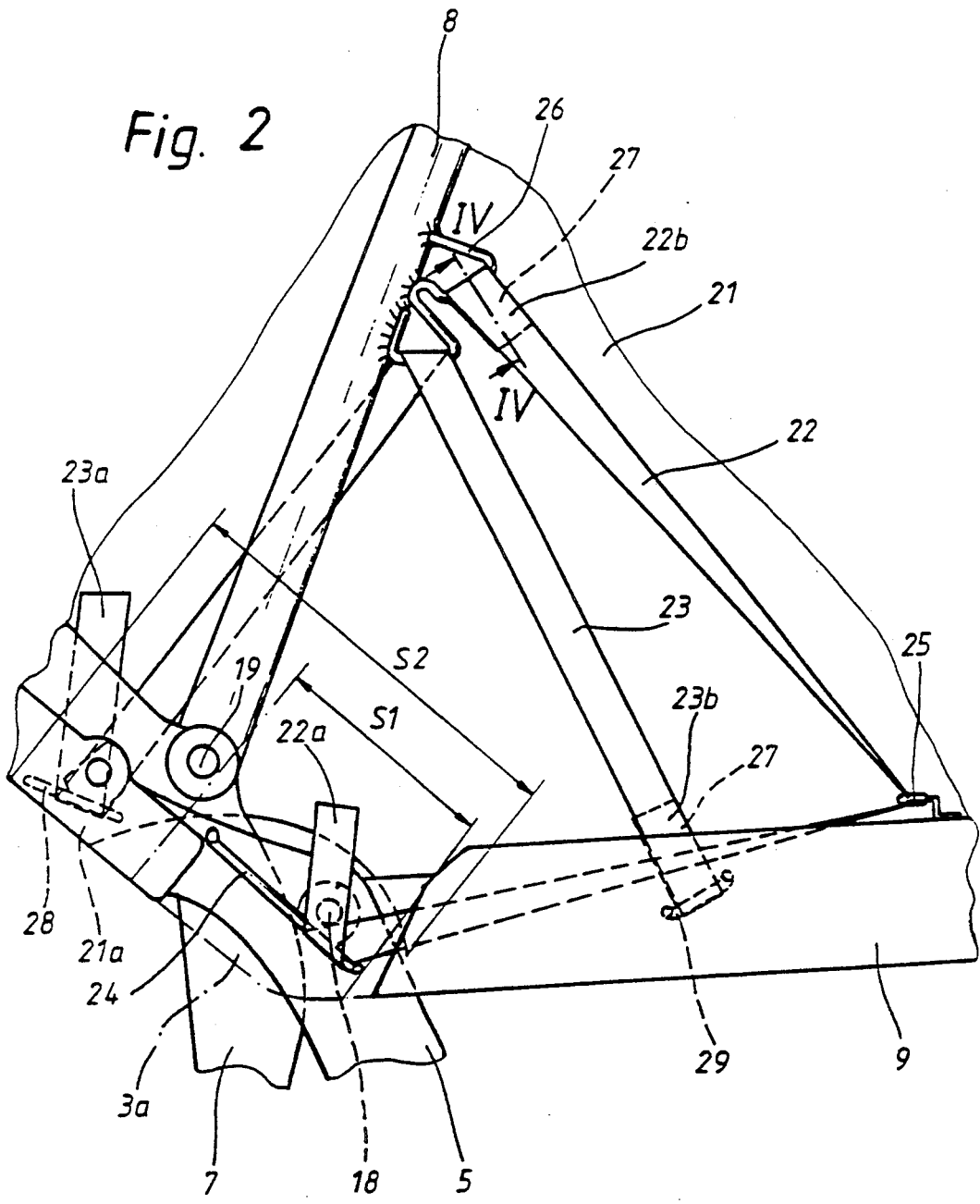
FIG. 2 is a schematic side view of a joint region of the folding top of FIG. 1, shown with the top closed.

A tension band arrangement, more clearly visible in FIG. 2, is provided for the indirect fixing of corner 3a and border zone 21a on the top support pillar 5, by which these edge regions are tautly stretched with the top 2 closed. This tension band arrangement comprises two flexible straps 22 and 23 of different lengths, each of which has an equally low longitudinal extensibility and consists of textile strap fabric, the strap 22 being intended for fixing the corner 3a and strap 23 being intended for fixing the edge zone 21a.

For the purpose of tensioning the corner 3a, an end region 22a of the strap 22 is sewed, bonded or secured in some other way over a certain area to the top cover 3 on the inside of the corner 3a. From the secured end region 22a, the strap 22 first of all extends downwards as far as a first U-shaped deflection hoop 24, which is fixed on the outside of the top support pillar 5 and the central leg of which extends approximately parallel to the inclination of the top support pillar 5. The central leg of the deflection hoop 24 is enfolded by the strap 22, after which the strap 22 extends rearwards in the longitudinal direction of the associated leg of the material retaining hoop 9. Attached to the upper side of the lateral leg of the material retaining hoop 9, approximately centrally, is a further U-shaped deflection hoop 25, the central leg of which is likewise enfolded by the strap 22. After the redeflection at the deflection hoop 25, the strap 22 extends at an angle of approximately 55° to the longitudinal axis of the material retaining hoop 9 towards the lateral leg, arranged above it, of the corner strut 8, and is connected via a holder 26 to the corner strut 8.

A leg of the holder 26 bent approximately in a U shape, which consists of bendable wire, is used for connection, the ends of the legs of the holder 26 being welded to the tube of the corner strut 8. The central region of the leg is enfolded by a loop 22b, which forms the upper connection region of the strap 22. As can be seen in conjunction with FIG. 4, the loop 22b comprises a folded-over end region of the strap 22 itself, a velcro-type fastener 27, by which the loop 22b is fixed being arranged between the loop bands which rest on one another. The velcro-type fastener 27 is released by pulling the loop bands apart, after which the loop length can be adjusted and is fixed again after the halves of the velcro-type fastener 27 have been pressed together. The adjustability of the length of the loop 22b thus provides a simple possibility for the adjustment of the length of the strap 22 itself. It goes without saying that instead of the velcro-type fastener 27, other known cling type fastening means could also be used for the stepless adjustment of the length of the strap 22. Since the strap 22, the course of which has been described, is tautly stretched, the corner 3a is pulled against the outer side of the top support pillar 5 and the side wall region of the top cover 3 above the corner 3a is held overall in a tensioned position, stretched such that it is free from folds, by the downward-directed tension on the corner 3a. A particularly favorable action of the tension on the side wall regions of the top cover 3 is here achieved by the course of the tension band shown, where the two mutually opposed directions of tension of the strap 22 form an approximately equilateral triangle with the longitudinal center axis of the lateral leg of the corner strut 8.

The strap 23 is secured by an end region 23a on the outer surface (facing the top cover 3) of the inner lining 21 resting flat against the inner lining in the region of the border zone 21a, the end region 23a extending downwards approximately parallel to the end region 22a. Secured in front of the hinge joint 19, on the rearward side face of the top support pillar 5, is a deflection hoop 28, which is likewise of approximately U-shaped configuration and which extends transversely to the plane in which the corner strut 8 is arranged. The central leg of the deflection hoop 28 is enfolded by the strap 23, after which the latter extends obliquely rearwards, approximately at right angles to the inclination of the top support pillar 5 and runs towards a deflection point below the U-shaped holder leg of the holder 26. Formed on the holder leg is a deflection eye, which is bent in the shape of a triangle and is likewise welded to the corner strut 8. In this arrangement, one leg of the deflection eye of the holder 26 extends approximately horizontally behind the corner strut 8 and thus projects from the latter. The projecting leg of the deflection eye is enfolded by the strap 23, which then extends obliquely rearwards and downwards, enclosing an angle of approximately 60° with the length lying in front of the deflection eye. The strap 23 ends with a loop 23b having a velcro-type fastener 27, by virtue of the adjustability of which, which corresponds to that of loop 22b, the tensioning length of the strap 23 can be varied. To secure it on the leg of the material retaining hoop 9, the loop 23b enfolds a retaining hoop 29 which is arranged on the inside of the material retaining hoop 9.

By virtue of the tensile forces of the strap 23, the border zone 21a itself and the side wall region of the inner lining 21 are thus tautly stretched and the border zone 21a is simultaneously pulled against the pillar 5.

As has already been explained the material retaining hoop 9 is raised during the opening of the folding top 2, being swung upwards relative to the top support pillar 5 about the hinge joints 18. As can be seen in conjunction with FIG. 3, the retaining hoop 29 and the deflection hoop 25 are moved closer to the corner strut 8 during this procedure and, at the same time, closer to the holder 26, and the straps 22 and 23 become increasingly slack. With the slackening of the straps 22 and 23, the corners 3a of the top cover 3 and the border zone 21a of the inner lining 21 are simultaneously released and the process of folding the top 2 is not hindered.

Upon reclosure of the folding top 2, the top frame likewise occupies the position shown in FIG. 3 before the final phase of the closing movement, and from this position the material retaining hoop 9 has to be pressed down into the position in which it rests locked on the top box lid 13 by swinging it down about its hinge joints 18. During this procedure, the corner strut 8 is swung exactly and automatically into its design position about its hinge joints 19, via the positioning straps 20, which tauten to an increasing extent as the material retaining hoop 9 is pressed down, and, as a result, the holder 26 also reoccupies the position shown in FIG. 2. Deflection hoop 25 and retaining hoop 29 also reoccupy their initial position at the same time with the material retaining hoop 9, the straps 22 and 23 again being stretched in such a way that they take up force.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Folding top for vehicles having a top cover which can be stretched over a supporting top frame and is held along its lower terminating edge by a U-shaped material retaining profile and along its rear terminating edges, which adjoin the side windows, by lateral top support pillars of a main strut, the main strut being attached to the bodywork of the vehicle via its pivotably mounted top pillars, having intermediate support for the top cover in a transverse plane between the material retaining hoop and the main strut by means of a U-shaped corner strut, the lateral legs of which corner struts are articulated on associated frame members, and having fixing of lateral border regions of the top cover on the associated frame member via first tie members, the first tie members connecting the terminating edges of the lateral border regions to the associated leg of the corner strut while being deflected at the frame member to pull the respective border region towards the frame member when the top is closed by virtue of the swinging of the corner strut relative to the material retaining profile, wherein the border regions to be fixed are held by the top support pillars of the main strut, the border regions including a lower length of the terminating edges of the top cover which extend along the top support pillars, and wherein the first tie members starting from their deflection on the associated top support pillar, first of all extend rearwards towards a deflection point on the material retaining profile, which deflection point is offset rearwards relative to the pivot axis of the corner strut, and after enfolding the deflection point, they extend forwards towards their holding point on an associated leg of the corner strut.

2. Folding top according to claim 1, wherein the corner struts are articulated on frame members moved with the top support pillars of the main strut, the lateral articulation points each lying above the border region.

3. Folding top according to claim 2, wherein the arrangement of the corner strut and the arrangement of the tie members is matched one to the other such that the longitudinal center axes of the lateral legs of the corner strut and the two directions of tension of the associated first tie member complement one another to form an approximately equilateral triangle.

4. Folding top according to claim 1, wherein the top frame of the folding top is covered towards the interior of the vehicle by a flexible inner lining which, close to the border regions to be fixed of the top cover, has border zones to be fixed in a corresponding manner on the top support pillars, and wherein the border zones of the inner lining are held via second tie members which are deflected at the top support pillars and are pulled into their end position, in which they fix the border zones, by the swinging movement of the corner strut during the closure of the top.

5. Folding top according to claim 4, wherein the second tie members are deflected at the associated leg of the corner strut and extend transversely to the longitudinal extent of the latter towards the material retaining profile, on which their rear ends are secured.

6. Folding top according to claim 1, wherein the tie members are flexible straps of low extensibility and of adjustable length.

7. Folding top according to claim 6, wherein the straps each comprise a loop, the loop length of which can be fixed in a variable manner by a velcro-type fastener.

8. Folding top according to claim 6, wherein essentially U-shaped deflection hoops are provided for the deflection of the straps.

9. Folding top according to claim 4, wherein a single holder is secured on each of the two lateral legs of the corner strut, on which holder the end to be held of the first tie member fixing the associated border region of the top cover is connected, and at which holder the second tie member which fixes the associated border zone of the inner lining is deflected.

10. Folding top according to claim 9, wherein the holder is formed in one piece from bending wire.

11. Folding top according to claim 5, wherein a single holder is secured on each of the two lateral legs of the corner strut, on which holder the end to be held of the first tie member fixing the associated border region of the top cover is connected, and at which holder the second tie member which fixes the associated border zone of the inner lining is deflected.

12. Folding top according to claim 11, wherein the holder is formed in one piece from bending wire.

13. Folding top for convertible vehicles comprising:
a foldable supporting top frame,
a top cover supported at the supporting top frame,
said supporting top frame including top support pillars pivotally mounted at bodywork of the vehicle, a main strut connecting the top support pillars, a U-shaped corner strut, and a material retaining hoop, said main strut top support pillars extending adjacent rear sides of side windows of the vehicle when the top is closed with the U-shaped corner strut behind the main strut and in front of a vehicle rear window and the material retaining hoop disposed rearwardly of the rear window to form rear terminating edge portions of the top,
and a pair of first tie member connecting respective lateral border regions of the top cover to the top frame such that the border regions are pulled taut when the top frame is moved to its top closed position,
wherein respective ones of said first tie members are deflected at the associated top support pillars, extend rearwardly towards a deflection point on the material retaining hoop, which deflection point is offset rearwards relative to the pivot axis of the corner strut, enfold the deflection point at the retaining hoop and then extend forward towards a holding point on an associated leg of the corner strut.

14. Folding top according to claim 13, wherein the top frame of the folding top is covered towards the interior of the vehicle by a flexible inner lining which, close to the border regions to be fixed of the top cover, has border zones to be fixed in a corresponding manner on the top support pillars, and wherein the border zones of the inner lining are held via second tie members which are deflected at the top support pillars and are pulled into their end position, in which they fix the border zones, by the swinging movement of the corner strut during the closure of the top.

15. Folding top according to claim 14, wherein the second tie members are deflected at the associated leg of the corner strut and extend transversely to the longitudinal extent of the latter towards the material retaining profile, on which their rear ends are secured.

16. Folding top according to claim 15, wherein the tie members are flexible straps of low extensibility and of adjustable length.

17. Folding top according to claim 16, wherein the straps each comprise a loop, the loop length of which can be fixed in a variable manner by a velcro-type fastener.

18. Folding top according to claim 17, wherein essentially U-shaped deflection hoops are provided for the deflection of the straps.

19. Folding top according to claim 18, wherein a single holder is secured on each of the two lateral legs of the corner strut, on which holder the end to be held of the first tie member fixing the associated border region of the top cover is connected, and at which holder the second tie member which fixes the associated border zone of the inner lining is deflected.

20. Folding top according to claim 19, wherein the holder is formed in one piece from bending wire.

* * * * *